United States Patent
Kellogg et al.

(10) Patent No.: US 8,065,667 B2
(45) Date of Patent: Nov. 22, 2011

(54) INJECTING CONTENT INTO THIRD PARTY DOCUMENTS FOR DOCUMENT PROCESSING

(75) Inventors: David Kellogg, Mountain View, CA (US); Greg I. Chiou, San Jose, CA (US)

(73) Assignee: Yahoo! Inc., Sunnyvale, CA (US)

(*) Notice: Subject to any disclaimer, the term of this patent is extended or adjusted under 35 U.S.C. 154(b) by 1227 days.

(21) Appl. No.: 11/726,082

(22) Filed: Mar. 20, 2007

(65) Prior Publication Data

US 2008/0235671 A1    Sep. 25, 2008

(51) Int. Cl.
*G06F 9/45* (2006.01)
*G06F 15/00* (2006.01)

(52) U.S. Cl. .................. 717/139; 715/205; 715/234

(58) Field of Classification Search ........... 715/205, 715/234; 717/139
See application file for complete search history.

(56) References Cited

U.S. PATENT DOCUMENTS

| | | | | |
|---|---|---|---|---|
| 5,968,125 | A * | 10/1999 | Garrick et al. | 709/224 |
| 6,738,804 | B1 * | 5/2004 | Lo | 709/219 |
| 6,938,205 | B1 * | 8/2005 | Hanson et al. | 715/234 |
| 6,961,750 | B1 * | 11/2005 | Burd et al. | 709/203 |
| 7,231,606 | B2 * | 6/2007 | Miller et al. | 715/738 |
| 7,681,112 | B1 * | 3/2010 | Francis | 715/201 |
| 2002/0023112 | A1 * | 2/2002 | Avital | 707/513 |
| 2002/0038368 | A1 * | 3/2002 | Kojima et al. | 709/225 |
| 2004/0133480 | A1 * | 7/2004 | Domes | 705/26 |
| 2006/0031751 | A1 * | 2/2006 | Ehud | 715/501.1 |
| 2006/0048214 | A1 * | 3/2006 | Pennington et al. | 726/5 |
| 2006/0075494 | A1 * | 4/2006 | Bertman et al. | 726/22 |
| 2006/0129632 | A1 * | 6/2006 | Blume et al. | 709/203 |
| 2006/0230011 | A1 * | 10/2006 | Tuttle et al. | 706/62 |
| 2007/0112714 | A1 * | 5/2007 | Fairweather | 706/46 |
| 2007/0143306 | A1 * | 6/2007 | Yang | 707/10 |
| 2007/0208751 | A1 * | 9/2007 | Cowan et al. | 707/10 |
| 2007/0234217 | A1 * | 10/2007 | Miller et al. | 715/738 |
| 2008/0033996 | A1 * | 2/2008 | Kesari | 707/104.1 |

* cited by examiner

*Primary Examiner* — Stephen Hong
*Assistant Examiner* — Marshon Robinson
(74) *Attorney, Agent, or Firm* — Hickman Palermo Truong & Becker LLP; Daniel D. Ledesma (57) ABSTRACT

Techniques for extracting content from a rendered page are provided. In one approach, a tool allows a user to specify executable code (e.g., JavaScript) to be inserted into a file (e.g., HTML file). The code-injected file is interpreted and the executable code is executed, including, optionally, any executable code already in the file. Content is subsequently generated and provided to another application for further processing.

34 Claims, 2 Drawing Sheets

INJECTING CONTENT INTO THIRD PARTY DOCUMENTS FOR DOCUMENT PROCESSING

FIELD OF THE INVENTION

The present invention relates to analyzing documents and, more specifically, to injecting code into documents to produce content that is useful to page analyzers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Various applications, including Web crawlers and document processors, analyze web-accessible files (e.g., HTML files) to extract and index information therefrom. Other applications may extract information from files for other purposes. For example, an application may extract information from files to categorize the files, to rate the files, or to test to see if the files satisfy certain criteria. An application that analyzes files is referred to herein as a page analyzer. A Web crawler is merely one example of a page analyzer. While Web crawlers may be used in examples given hereafter, the techniques described herein are not limited to any particular type of page analyzer.

Web-accessible files typically contain mark-up language code (e.g., HTML, XML, etc.) that dictates how the information is to be displayed when the files are interpreted by a browser. The visual output that is produced when such files are interpreted by a browser is referred to herein as a "rendered page" or "web page". Sometimes, interpreting a file to render a page involves executing code contained in the file.

The rendered page produced when a browser interprets a file often displays information contained in the file. In addition, the rendered page may include information referenced by the file, but not actually included in the file. While the file used to render a page typically contains basic textual characters, the page produced by interpreting the file may include structure, formatting, images, video, etc., instead of or in addition to simple text.

Unfortunately for the developers of page analyzers, many files contain executable code, such as JavaScript, that enables Web authors to create files that produce interactive web pages. A major use of web-based JavaScript is to write functions that are embedded in HTML files to perform tasks not possible in HTML alone. An example of this usage is opening or "popping up" a new window with programmatic control over the size, position and "look" of the new window (e.g., whether or not the menus, toolbars, etc. are visible). Another example of this usage is validating web form input values to make sure that the values will be accepted before they are submitted to the server. Another example is changing images or text as the mouse cursor moves over the images or text. This effect is often used to draw the user's attention to important links displayed as graphical elements.

Generally, the presence of executable code in files makes document analysis difficult, because most page analyzers are more interested in the content of the rendered page than in the content of the file that produces the rendered page. To effectively analyze pages that are produced by interpreting files, page analyzers must be able to gather text, follow links, capture popup windows, follow Asynchronous JavaScript and XML (AJAX) instructions, and otherwise analyze such files. Frequently, executable code within a file may cause content that is not reflected in the HTML of the file to be displayed when the file is interpreted by a browser. Page analyzers should take that content into account when analyzing the file.

The following is an example of a simple block of JavaScript code that may exist in a file:

```
<script>
    var a = yahoo.com;
    ...
    document.write("http://www." + a);
</script>
```

Before the above block of JavaScript code is executed, there is no browsable link to http://www.yahoo.com. When the above JavaScript block is executed, the link "http://www.yahoo.com" is generated, and content located at that link may be retrieved and displayed in a browser. The result of interpreting a file and executing any executable code in the file is referred to hereinafter as the "rendered page."

Without evaluating the content produced by execution of code on these files, the true intent of the web page authors is unknown. Numerous page analyzers may require a more accurate view of content on the Web than what is available strictly from the original file. For example, a page analyzer may index video content. Thus, the page analyzer aims to acquire links to video content on the Web. Frequently, however, video links are completely embedded in JavaScript, and therefore the video content is not indexed.

As another example, a page analyzer may extract product information, such as type of product and price, from files. Many product web pages are generated using templates. A few automated web publishing software packages generate highly dynamic content, such as product price, on web pages in JavaScript. Without complete JavaScript support, the page analyzer would not be able to make full sense of such files because the page analyzer would not be able to render the web page and, thus, would only "see" a portion of the actual content of the rendered page.

As another example, a page analyzer may be a web crawler that indexes information from files. Some spam websites use JavaScript code to conceal inappropriate content from web crawlers. Therefore, the page analyzer may interpret a file as providing legitimate information whereas a web browser may execute the JavaScript code and display only inappropriate content. This form of spam is known as "cloaking."

Based on the foregoing, there is a need to better process files (e.g., HTML files) with embedded executable code (e.g., written in JavaScript) to better extract application-specific information for page analyzers, such as web crawlers.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In one approach, a tool is provided that injects executable code (e.g., JavaScript) into one or more locations within a file (e.g., a HTML file) to create a code-injected file. The code that is injected in this manner is code designed to produce information for a specific page analyzer, and is therefore referred to herein as "analyzer-specific" code. The code-injected file is then executed using an interpreting engine. Information that is produced by executing the code-injected file is provided to the page analyzer for further processing. The tool used to inject the injected code may be, for example, a plug-in that is provided to an existing JavaScript interpreting engine, such as SpiderMonkey, Rhino, and KJscript.

In following description, various examples are given in the context of HTML, JavaScript, and web pages. However, embodiments of the invention are not limited to those contexts. For example, executable code other than JavaScript may be inserted in an HTML file, such as C++. As another example of a different context, the file may be a Shockwave Flash file (instead of an HTML file) that includes code that is executed when the file is accessed and interpreted. As another example of a different context, the file may be a Microsoft Word or Excel file with macros (i.e., the executable code) that are executed against the file to modify the text or data in the file.

Page Analyzer System

Figure 1:
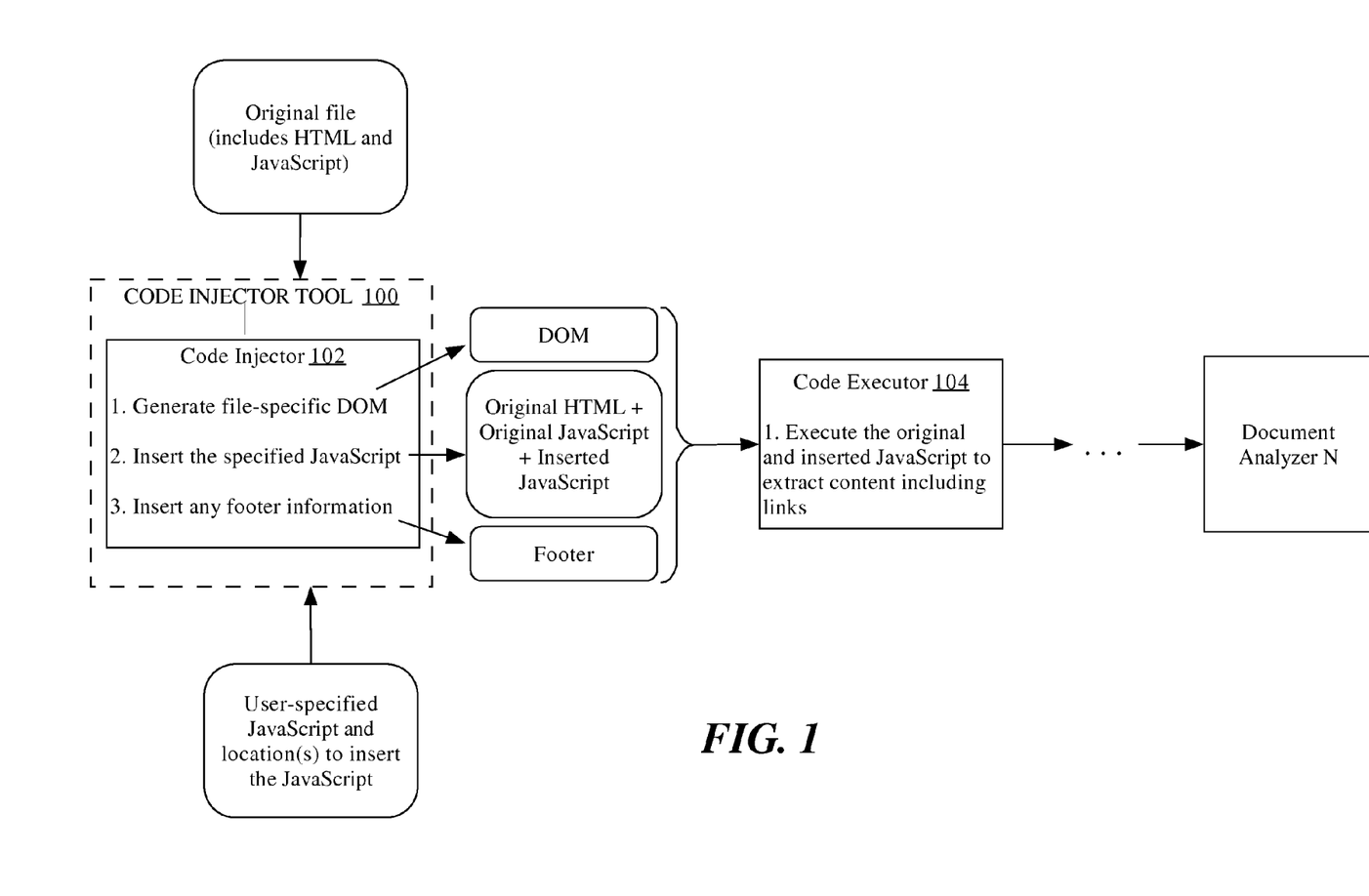
FIG. 1 is an example document processing environment that includes a code injector for inserting code into a file, according to an embodiment of the invention.

FIG. 1 is a block diagram of a simple document processing flow with multiple page analyzers. A code injector tool 100 includes a code injector 102 and allows a user to specify the injected code and one or more locations within a file and/or generated DOM tree to insert the injected code. According to one embodiment, code injector 102 (1) parses the original file and generate a file-specific DOM; and (2) insert the executable code in one or more locations in the file or DOM.

Code injector tool 100 may also allow a user to specify a set of files in which to insert the injected code. The set of files are typically from third parties, and thus may be retrieved over a local area network (LAN) or a wide area network (WAN), such as the Internet.

A file that existed prior to the insertion of executable code is referred to as an "original file". A file that contains injected code that has been injected by code injector 102 is referred to hereinafter as a "code-injected file."

In the illustrated embodiment, code injector 102 accepts as input one or more original files, each of which may include JavaScript code and/or other executable code. Executable code that is contained in a file prior to code injector 102 inserting injected code is referred to hereinafter as "original executable code".

Locations to Insert Injected Code

Code injector 102 also accepts as input the injected code and one or more locations, specified by the user, at which to insert the injected code. In the context of an HTML file, the locations may include, for example, the body of the HTML file, the file-independent header portion of the file, the file-dependent header portion of the file, the file-dependent footer portion of the file, the file-independent footer portion of the file, and the DOM tree that represents the file. The location into which the injected code is inserted may have a significant effect on the execution and/or timing of execution of the totality of the executable code (i.e., including original executable code and injected code). Such significant effects occur in the case of time-delayed functions and functions triggered by user events, such as form submission. The order of the injected code matters in many AJAX-rendered pages because the DOM must be created before JavaScript can act on the DOM. Also, the order of execution generally affects code values.

Because executable code, such as JavaScript code, is typically executed in sequence (i.e., the first block of code is executed, followed by the second block of code, etc.) the locations in which to insert injected code is important. For example, if the execution of injected code is to cause a play button to be selected, then the injected code needs to be inserted after the definition of the play button. As another example, if the execution of injected code is to check a checkbox that is part of a form, then the injected code includes code in the header portion of the file to (1) create a JavaScript Element object to represent a checkbox variable and (2) assign the variable a value that indicates, to an execution engine, that the checkbox is "checked." Another example is an AJAX-related download (one done after the page has been rendered initially), which changes the DOM after loading the page. Another example is when code is scheduled to be executed right after the loading of the page, when an "onload" event occurs.

In one embodiment, code injector tool 100 allows a user to specify code-injection locations on a source by source basis. Thus, the a user may specify that code is injected into the header section of files from a website A, and that code is injected into the footer section of files from website B. Thus, as code injector tool 100 is processing a file, the code injector tool 100 determines the source from which the file was obtained, and determines where to inject the code based on the source of the file. The actual code to inject may also be specified by a user on a source-by-source basis.

The Code Executor

A code executor 104 accepts as input the generated DOM and the code-injected file. Code executor 104 executes the original executable code and the injected code to generate content, some of which may not be in the original file, including any links. Content that is not in the original file, but which appears in executable code within the code-injected file is executed, is referred to herein as "code-produced content". The code-produced content may include (1) content generated from executing the original executable code (original-code-produced content) and (2) content generated from executing the injected code (injected-code-produced content).

Once code executor 104 has executed the code contained in the code-injected page, code executor 104 sends all, or a portion, of the generated content to another page analyzer for further processing. The generated content may be tagged to assist the subsequent page analyzer in distinguishing between original-code-produced content and injected-code-produced content.

Because code executor 104 may function as an execution engine within a browser, code executor 104 may output certain information regardless of the presence of injected code. For example, the original executable code is executed to generate any links to popup windows, links to video content that is time-delayed, and links to redirect pages. The links may be output by the code executor 104 regardless of whether there is any injected-code-produced content.

The above page analyzer system, including code injector 102 and code executor 104, does not require a browser to interpret a code-injected file and execute injected code. Therefore, a page does not have to be fully rendered (based on either the original file or the code-injected file) in order to access content generated by executing the original executable code and/or the injected code.

In one embodiment, code executor 104 provides at least a portion of the code-produced content, as well as the original file, to a subsequent page analyzer (e.g., page analyzer N). The combination of the original file and the portion of the code-produced content that is provided to the subsequent page analyzer is referred to as an "augmented file."

Although the illustrated embodiment shows code executor 104 separate from code injector tool 100, in another embodiment, code injector tool 100 includes code executor 104.

As FIG. 1 illustrates, there may be multiple page analyzers that analyze and/or operate on the code-produced content or portions thereof. Each page analyzer thus acts as one or more of a content extractor, a content analyzer, a content transformer, a content filter, etc. Page analyzer N may be, for example, an application that pushes content into a database or into an index that may be accessed when subsequent user queries are executed.

The Code Injector Tool

Code injector tool 100 may be software that is installed and executed on the user's computer. In another embodiment, the code injector tool is provided to a user through a Web interface so that the user does not have to install or configure any software. In this hosted solution approach, a form may be provided to a user that allows the user to specify executable code, the files in which to insert the executable code, and the location(s) within the files (and/or corresponding DOMs) to insert the executable code.

Generated Content

Code within the code-injected file may be executed in the same manner as original code, without requiring any modification to the code executor. The content of the page produced by interpreting the code-injected file is referred to herein as "generated content." When interpreting the code-injected file to produce the generated content, both the injected code and any remaining original code are executed. Consequently, the generated content may include both injected-code produced content, and original-code produced content.

Such generated content may include additional content that even a browser would not have displayed if the code-injected file were rendered. For example, the injected code may cause a "play" button, which existed in the original file, to be activated when the code-injected file is interpreted. Activation of the button, in turn, may cause additional links, e.g., to video content, to be generated.

Content that would have been contained in the web page produced by interpreting the original file is referred to herein as "original page content". Significantly, some of the original page content may not be included in the generated content.

For example, the injected code may rewrite original executable code to prevent certain content from being generated when the code-injected file is interpreted, thus removing "noisy" parts of the file, such as advertisements.

Code Injection to Facilitate Vertical Searches

One reason for providing a tool to allow users to insert code into a file is to facilitate vertical searches. A vertical search is a search that is targeted to a specific business, industry, or topic. A user typically thinks in terms of a vertical search. However, the major search engines typically return results based strictly on the terms of the query, which results may not be within the specific context that the user is interested in. For example, a dentist that enters "ceramics" as a query will likely see references to web pages about pottery, when the dentist would actually prefer to see references to web pages about the latest developments in ceramics relevant to dentistry. A vertical search, on the other hand, allows users to search within targeted and specific fields of interest, such as travel, shopping, dentistry, etc., so that the results of queries within a vertical search are (almost) always relevant to the users. With the disclosed code injector tool, individual end-users are able to create multiple personal vertical searches.

The code injection tool described herein may facilitate vertical searches by allowing users to inject into files code which, when executed, generates information specifically tailored to the vertical searches. An example of how the tool may be used in the context of shopping searches shall be given hereafter. However, a shopping search engine is merely one example of a type of vertical search system in which the tool described herein may be used.

Extracting Analyzer-Specific Information

A purpose of specifying the injected code, and the locations where to insert the injected code, is to extract analyzer-specific information for a particular page analyzer. A page analyzer may be, for example, an application that indexes shopping information for subsequent searching. In this example, instead of indexing all the information on all analyzed files, only information pertinent to shopping is indexed, such as numerals following a '$' and any images accompanying prices. The amount of information to index is therefore significantly reduced.

Such analyzer-specific information that is extracted from the generated content is referred to hereinafter as "extracted content." Extracted content may include text, graphics, popups, links, etc. Depending on the page analyzer for which the content is being extracted, the extracted content may be a relatively small subset of the generated content.

The extracted content may include information that would not have been in the original page content. Such information is referred to herein after as "new content." New content may include text, graphics, popups, links, etc. New content is produced as a result of changes made to the original file, which may include but is not limited to (1) the injection of injected code, and (2) modifications to original executable code.

For example, an HTML file may include a play button written in JavaScript. In a browser (e.g., Mozilla Firefox), if a user views the rendered page and selects the play button, a sequence of steps is performed. The last step in the sequence of steps may be opening up a window that automatically plays a video. Thus, a user may specify injected code and an appropriate location to insert the injected code (e.g., after the definition of the play button) to cause the play button to be selected when the code-injected file is interpreted. A subsequent page analyzer that indexes video content may then, as a result of using code injector tool 100 and code executor 104, access and index this "hidden" video content.

Additionally or alternatively, the user may seek to modify content that would be contained in a rendered page by removing information that is extraneous to a page analyzer. In that case, the injected code modifies the execution of original executable code that would otherwise generate information that is not contained in the original file. Therefore, "inserting" injected code may include modifying original executable code. Such extraneous information is referred to hereinafter as "extraneous content." An example of extraneous content is advertisements that are generated when a HTML file is accessed via a browser. Original executable code may be modified in such a way as to prevent advertisements from being generated when the injected code is executed.

Additionally or alternatively, the user may seek to modify content that would be contained in a rendered page by modifying the original executable code. The difference between this example and the previous example is that the purpose of modifying the original executable code is not to necessarily suppress extraneous content but to modify the original content, resulting in "modified content". For example, a page publisher may remove or obscure the original text in the DOM using JavaScript and then modify the DOM to add content. The purpose is to confuse web crawlers about the true nature of the new content that is ultimately seen by the viewer of that page. A publisher may remove an encyclopedic article, or one containing key words meant to be read by the crawler, and then add a series of advertisements to the page. Therefore, original executable code may be modified to prevent this confusion.

Document Object Model

According to an embodiment, a file-specific JavaScript Document Object Model (DOM) is generated to facilitate obtaining extracted content, new content, and modified content, and suppressing the generation of extraneous content.

A DOM is a description of how an HTML or XML document is represented in a tree structure. A DOM provides a structure that facilitates access to the elements of an HTML or XML document by scripting languages with object oriented features (e.g., JavaScript). Therefore, a DOM allows elements of structured documents to be accessed more easily. Because complete browser compatibility is not necessary to obtain the information required by a page analyzer, a complete DOM is not built. Rather, only those portions of the DOM that are required to obtain extracted content may be generated.

In addition to the file-specific DOM, a DOM that is common to all web pages may be generated. Such a DOM includes interfaces to the Window, Navigator, Screen, History, and Locations objects. The Window object is the top level object in the JavaScript hierarchy and represents a browser window. The Navigator object contains information about the client browser. The Screen object contains information about the client's display screen. The History object consists of an array of URLs that the user has visited within a browser window. The Location object contains information about the current URL and is part of the Window object. The reference http://www.w3schools.com/htmldom/default.asp provides additional information on these objects that are common to all web pages.

The HTML file is parsed in order to generate the file-specific DOM, which is later added to the head of a file. A user may specify whether the injected code is to be inserted in the original file and/or the DOM. The injected code is then inserted into the one or more locations specified by the user.

When interpreting the code-injected file, all or a portion of the code blocks, including any injected code, are then executed. Any variables and context set from previously executed code blocks are carried forward to the next code block. If an error is encountered when executing the code in the code-injected file, then the execution process does not necessarily halt. Similar to some current Web browsers, all code blocks that are able to be executed may be executed regardless of the failure to execute a previous code block.

A DOM allows a user to more easily specify injected code to insert in an original file in order to: (1) extract analyzer-specific data from a rendered page, (2) simulate user events, and (3) modify the original DOM or text of the rendered page, each of which is described in more detail below.

Data Extraction

As stated above, by providing a means for allowing users to insert injected code in a file, a user may extract useful pieces of information (i.e., "extracted content"). A file-specific DOM is iterated to gather the desired extracted content. For example, the following JavaScript code will output the title and the number of elements entitled "myInput" of the corresponding file:

```
<script type="text/javascript">
    document.write(document.title)
    function getElements( ){
        var x=document.getElementsByName("myInput");
        document.write(x.length);
    }
</script>
```

There are many other properties and methods that may be accessed through the file-specific DOM. The reference http://www.w3schools.com/js/js_examples.asp provides additional information regarding how JavaScript can be used to access the DOM of a file.

Simulate User Events

If the original file allows for user events, then the injected code may, when executed, simulate those user events. User events may include, without limitation, mouse clicks, mouse overs, checking a box, selecting an option in a menu, selecting a radio button, filling out and submitting forms, and selecting a "play" button. The following is an example of a JavaScript function to submit a form entitled "myform":

```
<script type="text/javascript">
    function formSubmit( ){
        document.getElementById("myForm").submit( );
    }
</script>
```

Accordingly, the injected code would be inserted in a location after which all the applicable variables have been defined, such as in the page-dependent footer portion of a rendered page.

By simulating user events, a user can navigate through various web pages and determine the effects of various user events, leading to the discovery of hidden parts of documents in web pages using JavaScript, such as an AJAX-enabled page. AJAX is a web development technique for creating interactive web applications. An AJAX-enabled web page allows the web page to "feel" more responsive by exchanging small amounts of data with the server behind the scenes, so that the entire web page does not have to be reloaded each time the user provides input. This is meant to increase the web page's interactivity, speed, and usability.

Modification of Original DOM and Text

Not only can a user extract useful information from a rendered page (including new content from simulating user events), in one embodiment the code injector tool allows a user to modify the original text of the file and/or DOM structure. For example, injected code may remove noisy parts of the rendered page, thus helping to improve the precision of extracted content, including new content. Noisy parts include, but are not limited to, advertisements generated by JavaScript. Advertisements are irrelevant and may not exist with the same copy on subsequent visits to the page.

Also, an increasing number of pages are rendered using AJAX or JavaScript alone. A message board may display all messages and then hide low-rated comments using JavaScript. The corresponding DOM may be altered so that the poorly-rated comments are not indexed.

Another example in which an original DOM may be modified is in AJAX-rendered maps that only show images through AJAX calls to the server. A common use of AJAX is to append a node to a parent node. In the map context, a parent node is a placeholder text, such as "Loading . . . ", which is replaced with a map. The map itself contains several new elements of the DOM.

Benefits and Miscellaneous

The code injector tool may be utilized by end-users in addition to web crawlers. Because the code injector tool includes an interface for an application to "hook" into various points in a file, custom JavaScript, or other executable code, can be inserted and executed in order to extract useful information (e.g., for a particular vertical search). Thus, individual end-users may use the code injector tool to create multiple personal vertical searches, especially when JavaScript is used as the scripting language to write the executable code. JavaScript is widely known and relatively simple (especially when compared to Perl and full-fledged object-oriented languages C++ and Java), thus lowering the barrier for entry in creating vertical searches.

Hardware Overview

Figure 2:
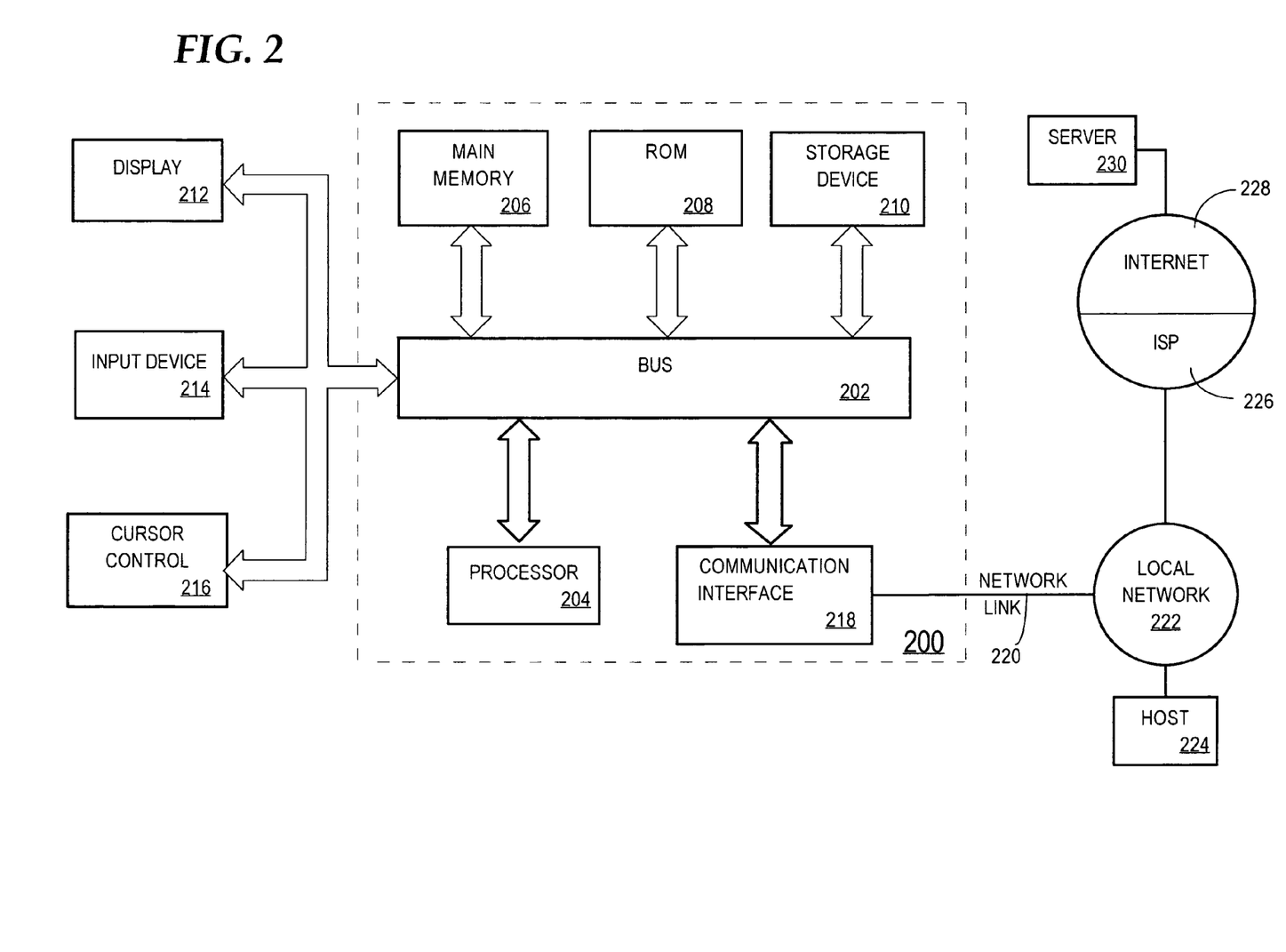
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media include, for example, optical or magnetic disks, such as storage device 210. Volatile media include dynamic memory, such as main memory 206. Transmission media include coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202.

Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   retrieving, from a plurality of sources, a plurality of files, each of which includes mark-up language code which, when interpreted by a browser, would cause the browser to render original page content for a page designed by a first party;
   receiving input that specifies, for each source of the plurality of sources, location information about where to inject executable code;
   after retrieving said plurality of files from said plurality of sources, determining, for a particular file of the plurality of files, a particular source from which the particular file was obtained;
   determining, based on the particular source, particular location information associated with the particular source;
   inserting, by a code injector tool under control of a second party that is different from said first party, said executable code into the particular file or in a document object model (DOM) generated based on the particular file, at one or more locations that are based on the particular location information associated with the particular source, to create a code-injected file;
   interpreting at least a portion of the code-injected file to produce generated content;
   wherein interpreting at least said portion includes executing at least some of the inserted executable code;
   wherein executing at least some of the inserted executable code includes executing inserted executable code that
     (a) modifies how executable code that originated in the file is executed;
     (b) excludes from the generated content a subset of the original page content;
     (c) generates new content that would not be in said original page content; or
     (d) simulates at least one user event; and
   providing at least a portion of the generated content to a particular application that performs operations based on the portion of the generated content, wherein the operations do not include displaying the portion of the generated content;
   wherein the method is performed by one or more computing devices.

2. The method of claim 1, wherein executing at least some of the inserted executable code includes executing inserted executable code that modifies how executable code that originated in the file is executed.

3. The method of claim 1, wherein executing at least some of the inserted executable code includes executing inserted executable code that excludes from the generated content a subset of the original page content.

4. The method of claim 1, wherein:
   executing at least some of the inserted executable code includes executing inserted executable code that generates new content that would not be in said original page content; and
   providing at least a portion of the generated content to the particular application includes providing at least a portion of the new content to the particular application.

5. The method of claim 1, wherein executing at least some of the inserted executable code includes executing inserted executable code that simulates at least one user event.

6. The method of claim 5, wherein the at least one user event is a user event in a set of user events consisting of a mouse click, a mouse over, a keystroke, selecting a button, submitting a form, and selecting an item in a menu.

7. The method of claim 1, wherein:
   the executable code that is inserted into said file is first executable code;
   when retrieved, the file includes second executable code; and executing at least some of the inserted executable code includes executing at least some of the first executable code and at least some of the second executable code.

8. The method of claim 7 wherein:
execution of the second executable code would cause the page to include content that is not contained in said file; and
execution of the first executable code causes generation of content that is not contained in said file.

9. The method of claim 1, wherein:
the method further comprises generating an augmented file based on said file and at least said portion of the generated content; and
providing at least said portion of the generated content to a particular application includes providing said augmented file to the particular application.

10. The method of claim 1, wherein executing at least some of the inserted executable code is performed without causing a browser to render said page.

11. The method of claim 1, wherein said operations are operations that index at least said portion of the generated content to enable users to search said portion of the generated content.

12. The method of claim 1, wherein the inserted executable code conforms to the JavaScript scripting language.

13. The method of claim 1, wherein inserting said executable code into the file to create a code-injected file also includes using the tool to:
generate a document object model (DOM) that represents the page; and
insert at least a subset of the executable code in the DOM.

14. The method of claim 1, wherein using a tool to insert executable code into the file to create a code-injected file includes using the tool to:
receive an indication of one or more locations in said file in which to insert portions of the executable code;
inserting said portions of the executable code at said one or more locations in the file.

15. The method of claim 14, wherein:
the file comprises at least one area of a set of areas consisting of a page-independent header, a page-dependent footer, a page-dependent head, and a page-independent footer; and
a subset of said one or more locations is within an area of said set of areas.

16. One or more volatile or non-volatile machine-readable storage storing instructions which, when executed by one or more processors, causes the performance of the method recited in claim 1.

17. One or more volatile or non-volatile machine-readable storage storing instructions which, when executed by one or more processors, causes the performance of the method recited in claim 2.

18. One or more volatile or non-volatile machine-readable storage storing instructions which, when executed by one or more processors, causes the performance of the method recited in claim 3.

19. One or more volatile or non-volatile machine-readable storage storing instructions which, when executed by one or more processors, causes the performance of the method recited in claim 4.

20. One or more volatile or non-volatile machine-readable storage storing instructions which, when executed by one or more processors, causes the performance of the method recited in claim 5.

21. One or more volatile or non-volatile machine-readable storage storing instructions which, when executed by one or more processors, causes the performance of the method recited in claim 6.

22. One or more volatile or non-volatile machine-readable storage storing instructions which, when executed by one or more processors, causes the performance of the method recited in claim 7.

23. One or more volatile or non-volatile machine-readable storage storing instructions which, when executed by one or more processors, causes the performance of the method recited in claim 8.

24. One or more volatile or non-volatile machine-readable storage storing instructions which, when executed by one or more processors, causes the performance of the method recited in claim 9.

25. One or more volatile or non-volatile machine-readable storage storing instructions which, when executed by one or more processors, causes the performance of the method recited in claim 10.

26. One or more volatile or non-volatile machine-readable -storage storing instructions which, when executed by one or more processors, causes the performance of the method recited in claim 11.

27. One or more volatile or non-volatile machine-readable storage storing instructions which, when executed by one or more processors, causes the performance of the method recited in claim 12.

28. One or more volatile or non-volatile machine-readable storage storing instructions which, when executed by one or more processors, causes the performance of the method recited in claim 13.

29. One or more volatile or non-volatile machine-readable storage storing instructions which, when executed by one or more processors, causes the performance of the method recited in claim 14.

30. One or more volatile or non-volatile machine-readable storage storing instructions which, when executed by one or more processors, causes the performance of the method recited in claim 15.

31. A method, comprising:
receiving input that specifies (a) executable code to inject and (b) location information about where to inject the executable code;
retrieving, from said source, said file that includes mark-up language code which, when interpreted by a browser, would cause the browser to render original page content for a page designed by a first party;
after retrieving said file from said particular source, a code injector tool inserting, by the code injector tool under control of a second party that is different from said first party, said executable code at one or more locations that are based on the location information to create a code-injected file;
interpreting at least a portion of the code-injected file to produce generated content;
wherein interpreting at least said portion includes executing at least some of the inserted executable code;
wherein executing at least some of the inserted executable code includes executing inserted executable code that simulates at least one user event; and
providing at least a portion of the generated content to a particular application that performs operations based on the portion of the generated content, wherein the operations do not include displaying the portion of the generated content;

wherein the method is performed by one or more computing devices.

32. A method, comprising:

retrieving, from a plurality of sources, a plurality of files, each of which includes mark-up language code which, when interpreted by a browser, would cause the browser to render original page content for a page designed by a first party;

receiving input that specifies, for each source of the plurality of sources, executable code to inject;

after retrieving said plurality of files from said plurality of sources, determining, for a particular file of the plurality of files, a particular source from which the particular file was obtained;

determining, based on the particular source, particular executable code associated with the particular source;

inserting, by a code injector tool under control of a second party that is different from the first party, the particular executable code, into the particular file or into a document object model (DOM) generated based on the particular file, to create a code-injected file;

interpreting at least a portion of the code-injected file to produce generated content;

wherein interpreting at least said portion includes executing at least some of the inserted executable code;

wherein executing at least some of the inserted executable code includes executing inserted executable code that (a) modifies how executable code that originated in the file is executed;

(b) excludes from the generated content a subset of the original page content;

(c) generates new content that would not be in said original page content; or (d) simulates at least one user event; and providing at least a portion of the generated content to a particular application that performs operations based on the portion of the generated content, wherein the operations do not include displaying the portion of the generated content;

wherein the method is performed by one or more computing devices.

33. One or more volatile or non-volatile machine-readable storage storing instructions which, when executed by one or more processors, causes the performance of the method recited in claim 31.

34. One or more volatile or non-volatile machine-readable storage storing instructions which, when executed by one or more processors, causes the performance of the method recited in claim 32.

* * * * *